United States Patent [19]
Knapp

[11] Patent Number: 5,609,179
[45] Date of Patent: Mar. 11, 1997

[54] AUTOMATIC SHUT-OFF VALVE

[75] Inventor: Alfred Z. Knapp, Bozeman, Mont.

[73] Assignee: Dawn Hartman, Kalispell, Mont.

[21] Appl. No.: 533,341

[22] Filed: Sep. 25, 1995

[51] Int. Cl.⁶ .................................................. F16K 17/40
[52] U.S. Cl. ..................... 137/68.16; 137/68.11
[58] Field of Search ............................... 137/68.11, 68.16

[56] References Cited

U.S. PATENT DOCUMENTS

| | | | |
|---|---|---|---|
| 3,512,317 | 5/1970 | Lynch | 137/68.16 X |
| 3,701,362 | 10/1972 | Reese | 137/68.16 X |

Primary Examiner—John C. Fox
Attorney, Agent, or Firm—Albert O. Cota

[57] ABSTRACT

An automatic shut-off valve for a fire hydrant or other device that is vulnerable to breakage, which is attached to a straight-walled fluid carrying pipe, the valve having a pair of separated mounting rings (20 and 22) positioned in the pipe near the breakable device. A cylindrical rod (36) having a frangible end (40) is slideably retained in the middle of the pipe by the rings and a disc (48) is positioned over the rod. A hub (66) is rigidly connected to the rod add a spring over the rod (72) forces the hub away from the ring. A link (60) connects the hub to the disc and the rod is pulled away from ring compressing the spring and opening the valve by positioning the disc parallel to fluid flow within the pipe. The rod is held in tension with a connecting bracket (44) that penetrates the hydrant or other device and in the event of damage such as actually shearing off or even a substantial jar a frangible end (40) of the rod breaks off releasing tension from the spring automatically rotating the disc into the closed position.

17 Claims, 2 Drawing Sheets

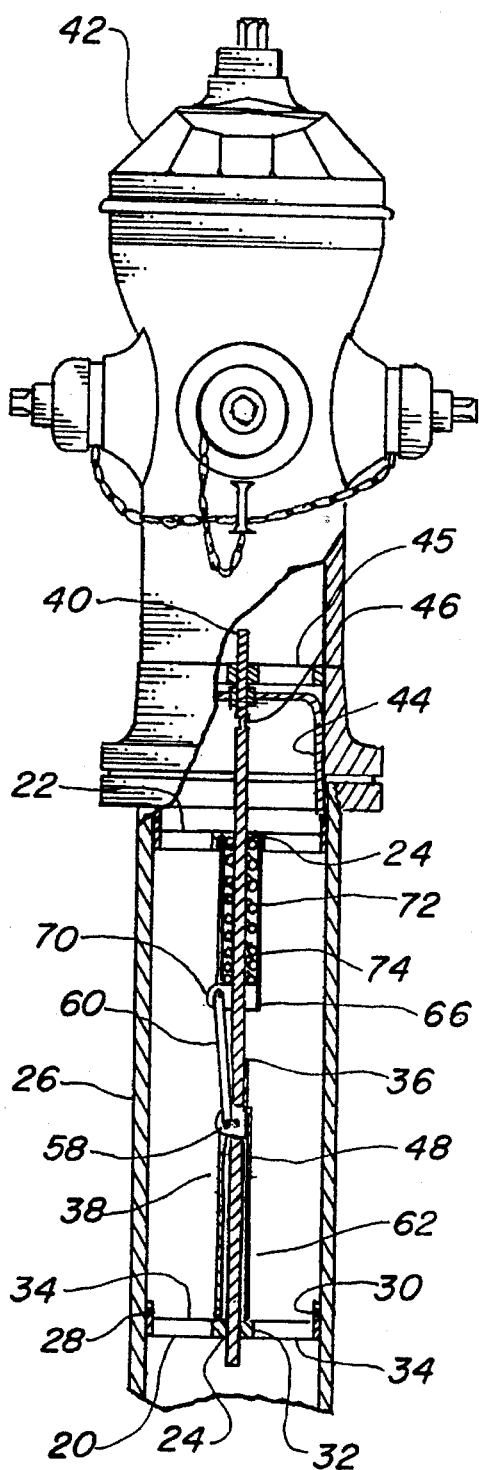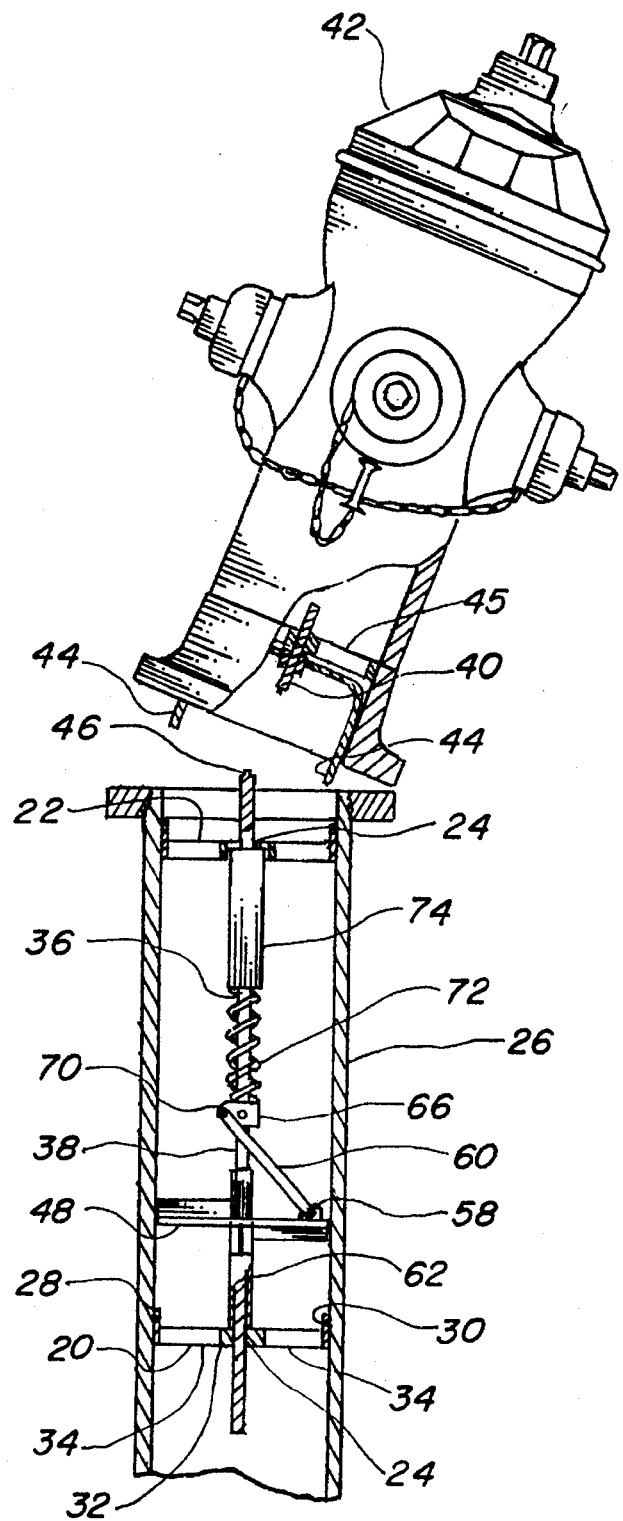

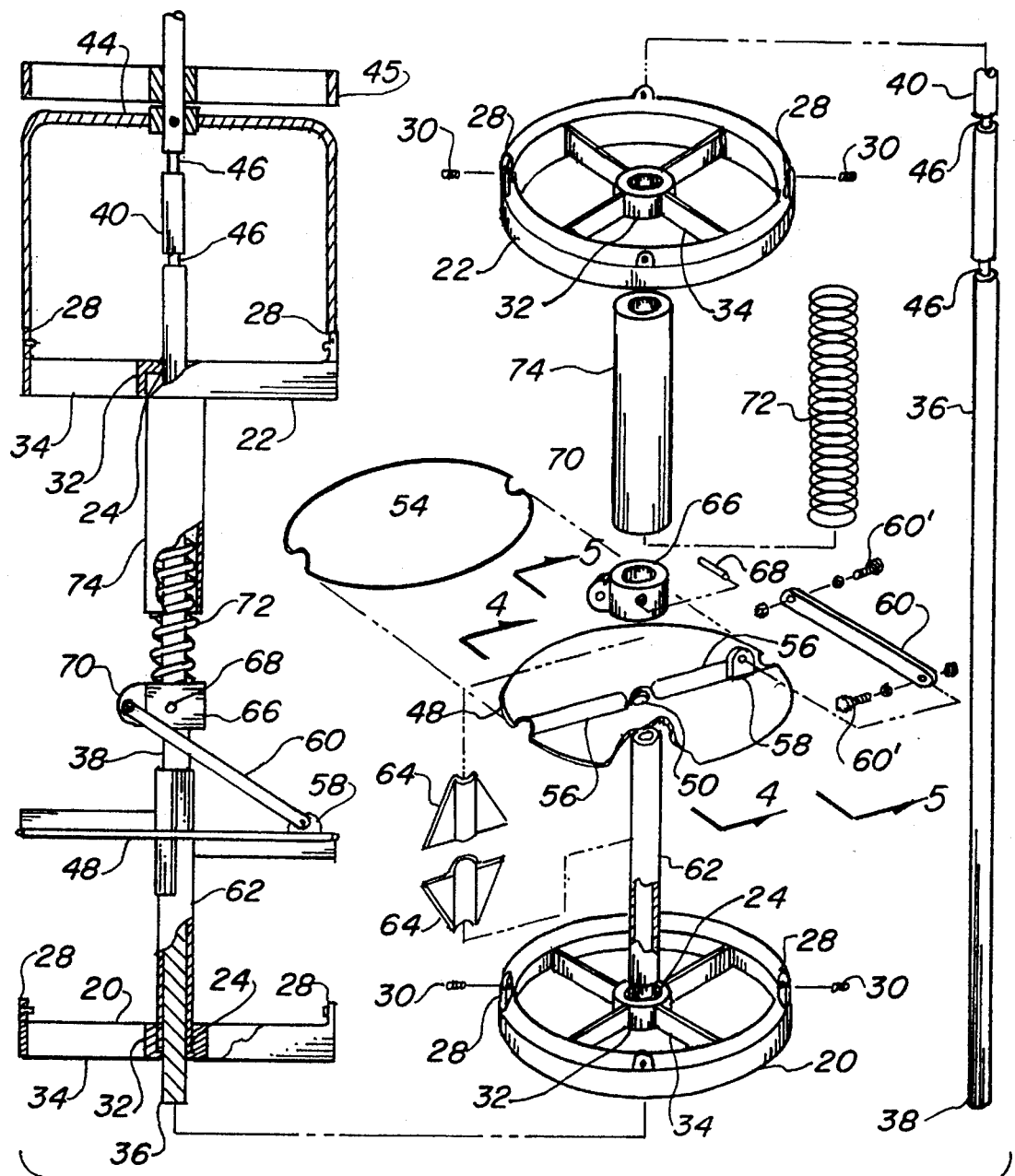

5,609,179

AUTOMATIC SHUT-OFF VALVE

TECHNICAL FIELD

The present invention relates to shut-off valves in general. More specifically to a shut-off valve having a spring loaded actuating rod with a frangible end which automatically closes the valve disc when broken.

BACKGROUND ART

Many types of valves have been used in the past to provide an effective means for achieving a shut-off position by sensing the pressure of flow of fluid. The present invention does not sense the presence of movement of fluid, instead, it automatically closes if a fire hydrant, control valve or the like, attached thereto, is physically damaged. The breaking of the adjacent device may occur when it is hit by a motor vehicle or jarred by a natural physical force such as an earthquake, storm, avalanche etc. Prior art historically relied upon the fluid within the pipe for an indication of a leak of breakage which by the very nature of the dynamic physical attribute is complex and costly.

A search of the prior art did not disclose any patents that read directly on the claims of the instant invention, however the following U.S. patents are considered related:

| U.S. Pat. No. | INVENTOR | ISSUED |
| --- | --- | --- |
| 4,880,030 | Terry | 14 November 1989 |
| 4,792,113 | Eidsmore | 20 December 1988 |
| 4,665,932 | Quenin | 19 May 1987 |
| 4,522,229 | Van de Moortele | 11 June 1985 |
| 4,180,088 | Mallett | 25 December 1979 |
| 3,805,673 | Fisher | 23 April 1974 |
| 3,298,390 | de Graff | 17 January 1967 |
| 3,183,928 | Rosenberg | 18 May 1965 |
| 3,079,938 | McCann | 5 March 1963 |
| 2,943,636 | Reed, et al | 5 July 1960 |

Terry in U.S. Pat. No. 4,880,030 teaches a water valve with capability of manually shutting off the water flow and also as a safety control device to sense excessive pressure wherein the water pressure will overcome the force exerted by a spring and force a piston against a flange blocking apertures thus stopping the flow of water.

U.S. Pat. No. 4,792,113 issued to Edismore utilizes a flow limit valve providing sharp valve closure at a limiting flow rate using a piston and a pair of magnets moving a pin with one magnet outside and the other inside the valve body.

Excessive velocity of a fluid is sensed by static and total pressure which in turn electrically controls the movement of a rod to actuate the safety valve U.S. Pat. No. 4,665,932 of Quenin.

Van de Moortele in U.S. Pat. No. 4,522,229 discloses a valve that cuts off water supply at a predetermined maximum flow and automatically returns to its initial position when reduced flow is present. This is accomplished by a flow regulator with a diaphragm in a precontrol chamber measuring flow and shutting off the flow from the discharge chamber.

U.S. Pat. No. 4,180,088 of Mallett utilizes an electrical circuit with a flow sensor turning off a valve when a leak occurs.

U.S. Pat. No. 3,183,928 issued to Rosenberg relates to a shut-off valve intended to control a feed line conduit through which a fluid flows, automatically shutting off when upstream pressure drops below a minimum value. This shut-off is accomplished by a spring loaded arm actuating a cock when insufficient pressure is available to retain its open position, Reed et al in U.S. Pat. No. 2,943,636 discloses a hydrant fueling valve for fueling and defueling aircraft, operated by pressure of the fluid flowing through the valve regardless of the direction. A pilot valve and piston are utilized.

For background purposes and as indicative of the art to which the invention relates reference may be made to the Patents issued to Fisher and McCann.

From the above described prior art, it is seen that the use of a breakable spring loaded mechanism to close a valve in the event of physical damage is clearly lacking.

DISCLOSURE OF THE INVENTION

The need for a shut-off valve to restrict the flow of fluid through a pipe in the event of breakage or some other physical damage has been present for some time. However, due to complexity, cost and initial pressure loss restriction, the valves presently in use have not been popular.

It is therefore a primary object of the invention to employ a simple mechanism that is inserted in an existing pipe and held in place by set screws. The invention has minimal fluid resistance in its open position. Further, this valve is attached to a device that is susceptible to breakage. A rod is attached to the device holding a spring in its compressed position and is linked to a butterfly-like valve disc parallel with the fluid flow. If the device adjacent to the valve is physically damaged by breaking off or is deformed, the rod breaks off automatically closing the valve, thereby shutting off the flow of fluid through the pipe.

An important object of the invention is that any pipe or fluid therein such as water, crude oil, refined petroleum in all its forms and any other liquid may be carried in the pipe. No modification to the pipe itself is required, only attachment to some type of valve that may be susceptible to breakage. The control device may be a fire hydrant, control-valve located above ground, expansion loop, or even a pipe bridge crossing an expanse with some possibility of breakage. The applications are broad and incorporate protection from loosing of the contents within the pipe at any exposed location. If no valve or control device is used, the invention may be employed by simply inserting it into an adjoining section of pipe with a long rod, within the adjacent pipe that may be subject to breakage.

Another object of the invention is directed to the actual physical damage required to actuate the valve. The sensitivity to breaking, bending, shaking or rocking may be governed by the type of material, relative to strength and brittleness and also the amount and size of material on the frangible end of the rod. For example, the rod may have any number of grooves, flats or nicks cut in any shape or diameter which would fracture and separate at a predetermined stress or bending moment. This flexibility permits protection from external sources such as earthquakes, wind, storms and physical striking of the device. A good example of the application is a fire hydrant. Today's fire hydrants are already equipped with shear pins on the flange near the ground which allow the hydrant to be broken off without damaging the attaching piping, thus permitting quick repair. The invention in this application would have the attaching rod connected to the interior of the hydrant with a connecting ring and if struck by a motor vehicle or the like, even if not broken completely off, would fracture the rod and shut off the flow of water until repair could be made. The broken end of the rod may be replaced and the new or repaired hydrant reattached in a short time without shutting down the entire water supply system.

Still another object of the invention is the ability of the valve to be functionally operable over a long period of time without the necessity of having an outside source of power. In actuality, the pressure of the fluid within the pipe assists in closing the butterfly like valve however, it is not necessary as the compression spring supplies sufficient inertial energy to accomplish the task even on very low pressure piping such as natural gas servicing a structure.

Yet another object of the invention is its ease of installation as an upstream mounting ring is simply inserted inside the pipe and set screws are tightened from the inside. A rod and disc assembly are then inserted in a hole in the center of the ring and an upstream ring is then slipped over the rod and attached in a similar manner. The rod is attached to the control device with a connecting ring, bracket or the like and the installation is completed. On pipes that are too small to reach inside, the rings may be held from the outside and the valve has the same utility of a serrate section of pipe.

A final object of the invention permits the degree of closure to be determined by the cost impact. Some applications find some leakage permissible and less expensive loose tolerance components may be employed. Other uses require zero leakage and machined parts may be required with the use of an O-ring on the periphery of the restricting disc. Further, a resilient seal in the interface of the rod and the central penetration of the disc may be required for a completely positive seal.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partially cut away side elevation view of the preferred embodiment illustrating the valve in the open position.

FIG. 2 is a partially cut away side elevation view of the preferred embodiment illustrating the valve in the closed position.

FIG. 3 is a exploded view of the preferred embodiment.

FIG. 4 is a cross sectional view taken along lines 4–4 of FIG. 3 illustrating the restricting disc configuration.

FIG. 5 is a cross sectional view taken along lines 5–5 of FIG. 3 illustrating the restricting disc configuration.

FIG. 6 is a partial isometric view of the disc retainers completely removed from the invention fop clarity.

FIG. 7 is a exploded view of the hub with two fingers and links completely removed from the invention for clarity.

FIG. 8 is a partial isometric view of the restricting disc with two link mounts completely removed from the invention for clarity.

FIG. 9 is a isometric view of the replacement section completely removed from the invention for clarity.

FIG. 10 is a partial isometric view of an alternate embodiment of the link means in the form of a ball joint linkage assembly shown completely removed from the invention for clarity.

BEST MODE FOR CARRYING OUT THE INVENTION

The best mode for carrying out the invention is presented in terms of a preferred embodiment. The preferred embodiment, as shown in FIGS. 1 through 6 is comprised of rod centering means in the form of a downstream mounting ring 20 and a upstream mounting ring 22 both having a central hole 24 therein. The rings 20 and 22 ape spaced apart such that the holes are in alignment. The rings 20 and 22 are inserted into a pipe 26 that has straight internal walls and are held in place with attaching means comprised of a number of bosses 28 integrally formed in the mounting rings. Each boss 28 contains at least one threaded hole in which a set screw 30 is rotatably engaged. The set screws 30 place outward pressure on the pipe holding the rings 20 and 24 securely in place. Any other attaching means may also be used with equal ease and dispatch.

The mounting rings 20 and 22 further include a spindle 32 in the middle containing the central hole 24 as previously described. This spindle 32 is held in place by a number of spokes 34 that are either integral or attached to the rings 20 and 22. The spokes 34 are relatively thin permitting fluid to pass freely by minimizing pressure loss through the valve.

A cylindrical rod 36 is slidably positioned through the central holes 24 in the spindles 32 of the mounting rings 20 and 22. This rod 36 consists of a rigid portion 38 and a frangible end 40. The frangible end 40 is retained by a breakable control device or at least one vulnerable to breakage such as a fire hydrant 42, illustrated in FIG. 1 and 2 or a control valve, expansion loop, pipe bridge, etc. The method retaining the rod 36 varies as to the particular device and is preferably a single u-shaped connecting bracket 44 as shown in FIG. 3 or any other type as long as it holds the rod in a locked open and pre-set rigid position. The actual configuration of the bracket 44 is dependent upon the internal shape of the device, upon which the invention is mounted and each bracket may be custom fitted to the particular style and size, provided the restricting limitations above are adhered to.

The frangible end 40 of the rod 36 is easily broken due to its construction of brittle material and/or the addition of one or more grooves 46 having a cross section smaller than the rod. The grooves 46 may be replaced by flats, notches or the like, to provide the susceptibility to breakage.

A restricting disc as is the rotating element that shuts off the fluid flow and is normally positioned parallel to the flow and, when rotated 90 degrees, completely blocks the flow of fluid through the pipe. The disc 48, shown best in the exploded view of FIG. 3, has a centrally located penetration 50 through which the rod 36 is inserted. The penetration 50 is shaped to permit the above mentioned rotation and is close enough in tolerance to form a seal. If a complete leak-proof shut-off valve is required, a resilient seal 52 may be added to this interface joint. The disc further includes opposed radial indentations 56 permitting the disc 48 to nest essentially into the rod 36 when rotated to a closed position, minimizing the fluid pressure loss across the valve. The fact that the radial indentations 56 are opposed, creates a stop for the disc 48, preventing rotation further than 90 degrees on the rod 36 as the top of one and bottom of the other impinge on the rod, limiting the travel automatically.

One or more upstanding pivot brackets 58 are mounted on the disc 48 at a position adjacent to one of the radial indentations 56 and link means, in one form, consists of a mechanical link 60 with attaching hardware attached thereto. While one bracket 58 and link 60 may be sufficient for operation with small and low of medium pressure systems, shown in FIG. 3, two or more may be required in larger and higher pressure systems as illustrated in FIG. 7 and 8.

In another embodiment, for very low pressure systems, the link means, illustrated in FIG. 10 may consist of a ball joint linkage assembly 61 that is made up of a connecting rod link 63 with ball joints 65 on each and. The ball joints 65 may be attached to the finger 70 on the hub 66 and the pivot bracket 58 on the disc 48 or the finger and bracket may be completely eliminated and the joints 65 attached directly to the hub 66 and disc 48.

Disc rotating means consist of a hollow spacer sleeve 62 located over the rod 36 contiguous with the downstream mounting ring 20 and within the penetration 50 in the disc 48. A pair of opposed disc retainers 64, shown removed from the invention in FIG. 6, are attached over the sleeve 62 above and below the disc 48, retaining the disc inbetween. As previously described, the radial indentations 56 limit the rotational movement to 90 degrees and the disc retainers 64 impede the vertical travel of the disc 48, permitting the disc to rotate freely but only on one distinct pivot point. The retainers 64 are positioned a part at a distance equal to the thickness of the disc 48, thus, permitting juxtaposition of the radial indentations 56 with the sleeve 62. When the radial indentations 56 are in the open position, the pressure restriction loss of the fluid in the pipe is minimized.

A hub 66 is fixably attached to the rod 36 by a pin 68 as illustrated best in FIGS. 3 and 7 and contains an integral protruding finger 70 which rotatably attaches to one end of the link 60. As the opposite end of the link 60 is connected to the pivot bracket 58 on the disc 48, rotation of the disc is accomplished when the rod 36 is linearly moved up and down.

A compression spring 72 is located over the rod 36 between the upstream mounting ring, providing the inertial force to rotate the disc 48 through the connection of the link 60 from the hub to the For precluding turbulent fluid flow over the spring 72 a hollow enclosure 74 may be added over the spring as depicted in FIG. 3.

When the shut-off valve is installed in the pipe, the rod 36 is physically pulled against the restriction of the spring 72 rotating the disc 48 to the fully closed position and the rod is then retained in this position by the bracket 44. A centering ring 45 shown in FIGS. 1–3 is slipped over the frangible end 40 of the rod 36 and is contiguous or near the bracket 44. The purpose of the ring 45 is to maintain the central position of the rod 36 and assure rigidity in order to continually sustain this location relative to the attaching device placed upon the invention. A fire hydrant 42, or any other valve or device vulnerable to breakage, is positioned over the ring 45 and bracket 44 in the manner normal to the application and the invention is now sealed in the pipe with minimal fluid flow resistance, as only a small cross sectional area is taken up by the valve itself. Alternatively, the ring 45 may be placed inside the hydrant, or other device, the proper distance from the end and then the entire device slipped over the rod 36 and attached in the conventional manner to the pipe. In the event that the hydrant 42 or other device is broken off or jarred substantially, the frangible end 40 of the rod 36 breaks off as it is centered by the ring 45. When the rod breaks, it releases the rod from its attachment to the connecting bracket 44 and the permanently attached hub 66 moves away from the ring 22. This action pushes the link 60 in the same direction and rotates the disc 48, 90 degrees thereby automatically shutting-off the flow of fluid from the pipe.

Once the rod 36 is broken add the valve is closed, it may be reset by substituting the broken frangible end 40 with a replacement section 76, shown in FIG. 9, having the same construction except a coupling 78 is added to one end that may be slipped over the rod 36 and anchored in place with fastening means such as set screws or the like. The hydrant 42 or other device may be repaired or replaced and installed in the same manner as the original using the same bracket 44 and centering ring 45.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claim:

1. An automatic shut-off valve for a fluid carrying pipe that has straight internal walls contiguous with an attached device vulnerable to breakage comprising:
   a) a rod having a rigid portion and a frangible end with the frangible end retained by the pipe attached device vulnerable to breakage,
   b) rod centering means for slidably retaining the rigid portion of the rod in the center of the fluid carrying pipe,
   c) a restricting disc rotatably positioned on the rigid portion of the rod, add
   d) disc rotating means attached to the rod compressably urging the rod away from the device vulnerable to breakage said rotating means further having link means connected to the restricting disc such that when the device attached to the pipe is broken off the frangible end is disconnected permitting the link means to rotate the disc to a restricting position under the urging of the rotating means shutting-off fluid flow within the pipe in which the shut-off valve is mounted.

2. The shut-off valve as recited in claim 1 wherein said rod frangible end further comprises a grooved cross section smaller than the rod of brittle material permitting breakage when bent in any direction.

3. The shut-off valve as recited in claim 1 wherein said rod centering means further comprises a downstream mounting ring and an upstream mounting ring each having a central hole therein, said rings spaced apart with the rigid portion of the rod slidably positioned within the holes permitting the rod to slide freely therebetween while in a pipe center.

4. The shut-off valve as recited in claim 3 wherein said mounting ring further comprises a plurality of periphery located raised bosses having a threaded hole in each one and a plurality of threaded set screws disposed within said holes to lock each mounting ring in place inside the pipe.

5. The shut-off valve as recited in claim 1 wherein said restricting disc having a centrally located penetration and opposed radial indentations permit the disc to nest essentially onto the rod when inserted thereon permitting the disc to be centrally parallel to the rod and fluid flow when the disc is in an open position.

6. The shut-off valve as recited in claim 1 wherein said link means connected to the restricting disc further comprises a ball joint linkage having a connecting rod link between ball joints affixed upon each end.

7. The shut-off valve as recited in claim 5 wherein said restricting disc further comprises at least one upstanding pivot bracket mounted on the disc at a position adjacent to one of the radial indentations permitting the link means to connect to the disc for actuation thereof under the urging of the rotating means.

8. The shut-off valve as recited in claim 1 further comprising a centering ring positioned inside the device vulnerable to breakage to centrally maintain the rods position permitting breaking of the rod's frangible end.

9. The shut-off valve as recited in claim 7 wherein said disc rotating means further comprises:
   a hollow spacer sleeve attached to said rod centering means juxtapositioned with each of the radial indentations,
   a pair of opposed retainers attached to the hollow spacer separated a thickness of the disc apart securing the disc inbetween while permitting rotation thereof essentially 90 degrees from the rod center,
   a hub fixably attached upon the rod having an integral protruding finger for attachment of the link means, and
   a compression spring disposed over the rod between the disc centering means and the hub urging the hub away from the centering means when the frangible end of the rod is broken, rotating the disc through the link means to a closed position shutting off flow of fluid through the pipe.

10. The shut-off valve as recited in claim 9 further comprising a hollow enclosure disposed over the compression spring for precluding excessive pressure loss of fluid within the pipe due to turbulent flow over the spring coils.

11. An automatic shut-off valve for a straight walled fluid carrying pipe that is connected to a breakable control device comprising:
   a downstream mounting ring having a central hole therein held inside the straight walled pipe with attaching means,
   an upstream mounting ring having a central hole therein held inside the straight walled pipe with attaching means spaced apart from the downstream mounting ring,
   a cylindrical rod having a rigid portion and a frangible end with the frangible end retained by the breakable control device attached to the fluid carrying pipe, and the rigid portion slidably disposed within the central hole of the mounting ring,
   a restricting disc having a centrally located penetration and opposed radial indentations permitting the disc to nest essentially onto the rod when inserted thereon through the penetration, and rotate in one direction from parallel with the pod to a position 90 degrees therefrom until the opposed radial indentations embrace the rod and restrict further rotation, said disc further having link means connected to a upstanding pivot mount for rotation of the disc,
   a hollow spacer sleeves having opposed disc retainers attached thereto, disposed upon the rod contiguous with the downstream mounting ring and through the restricting disc constituting a pivotal restriction for the disc,
   a hub fixably attached upon the rod having an integral protruding finger attached to the link means of the disc, rotating the disc 90 degrees when the hub is moved away from the upstream mounting ring, and
   a compression spring surrounding the rigid portion of the rod between the downstream mounting ring and the hub such that when the breakable control device is broken off the frangible end is disconnected permitting the link means to rotate the disc to a restricting position under the urging of the spring shutting off fluid flow within the fluid carrying pipe in which the shut-off valve is mounted.

12. The shut-off valve as recited in claim 11 wherein said attaching means further comprises a plurality of set screws threadably engaging bosses integrally formed into the downstream and upstream mounting rings maintaining outward pressure upon the pipe in which the shut-off valve is mounted locking the mounting rings in place.

13. The shut-off valve as recited in claim 11 wherein said mounting rings further comprises a spindle in the rings middle containing said central hole, a plurality of outwardly depending spokes integral with the spindle and an outer ring attached to the spokes permitting fluid to pass freely through the rings while retaining the rod therein.

14. The shut-off valve as recited in claim 11 wherein said rod frangible end further comprises a grooved cross section smaller than the rod of brittle material permitting breakage when bent in any direction.

15. The shut-off valve as recited in claim 11 wherein said rod frangible end further comprises at least one groove having a smaller cross section than the rod permitting breakage when bent in any direction.

16. The shut-off valve as recited in claim 11 wherein said disc further having a peripheral groove therein and an o-ring partially disposed within the groove to create a tight seal when closed.

17. The shut-off valve as recited in claim 11 further comprising a centering ring positioned inside the device vulnerable to breakage to centrally maintain the rods position permitting breaking of the rod's frangible end.

* * * * *